(12) United States Patent
Graham et al.

(10) Patent No.: US 6,886,216 B2
(45) Date of Patent: May 3, 2005

(54) CASTER LEG ASSEMBLY WITH ADJUSTMENT LOCKING MEANS

(75) Inventors: Thomas Graham, Ocean, NJ (US); Martin P. Burns, Forked River, NJ (US)

(73) Assignee: Component Hardware Group, Inc., Lakewood, NJ (US)

( * ) Notice: Subject to any disclaimer, the term of this patent is extended or adjusted under 35 U.S.C. 154(b) by 0 days.

(21) Appl. No.: 10/674,863

(22) Filed: Sep. 30, 2003

(65) Prior Publication Data

US 2005/0066472 A1 Mar. 31, 2005

(51) Int. Cl.⁷ .............................................. A47B 91/06
(52) U.S. Cl. .............................. 16/42 T; 16/19; 16/32; 16/38; 16/43; 403/377
(58) Field of Search .................... 16/42 T, 19, 32, 16/33, 38, 39, 43; 248/188.2, 188.4, 188.5, 188.8, 188.9; 280/43, 43.14, 43.2, 43.21; 403/377, 225–228, 109.1, 109.4, 109.5

(56) References Cited

U.S. PATENT DOCUMENTS

| | | | | |
|---|---|---|---|---|
| 331,297 A | * | 12/1885 | Hall ........................ 248/188.4 |
| 1,429,187 A | * | 9/1922 | Bunker ........................... 16/19 |
| 1,491,204 A | * | 4/1924 | Epting ............................ 16/19 |
| 1,753,183 A | * | 4/1930 | Johnson .......................... 16/39 |
| 1,915,203 A | * | 6/1933 | Spayd, Jr. ....................... 16/19 |
| 2,155,826 A | * | 4/1939 | Herold ........................... 16/38 |
| 2,339,577 A | * | 1/1944 | Nalle .............................. 16/19 |
| 2,430,737 A | * | 11/1947 | Roe ................................ 16/39 |
| 2,456,480 A | * | 12/1948 | Austin ........................ 248/351 |
| 2,592,942 A | * | 4/1952 | Moore ...................... 248/184.1 |
| 3,430,287 A | * | 3/1969 | Schroeder .................... 16/42 R |
| 4,708,154 A | * | 11/1987 | Edwards ...................... 135/84 |
| 4,723,633 A | * | 2/1988 | Duncan ...................... 182/230 |
| 4,969,232 A | * | 11/1990 | Michel ........................ 16/350 |
| 5,566,926 A | * | 10/1996 | Voigt | |
| 6,796,001 B1 | * | 9/2004 | Finkelstein ..................... 16/32 |

FOREIGN PATENT DOCUMENTS

| | | | | | |
|---|---|---|---|---|---|
| JP | | 02303901 A | * | 12/1990 | ........... B60B/33/06 |
| JP | | 09220261 A | * | 8/1997 | ............. A61G/5/02 |

* cited by examiner

*Primary Examiner*—Chuck Y. Mah
(74) *Attorney, Agent, or Firm*—Francis C. Hand; Carella, Byrne, Bain etal

(57) ABSTRACT

The caster leg assembly has a slidable collar mounted on a shank that is threaded onto a stud fixed within a hollow table leg. A resiliently deformable ring is positioned between a shoulder on the shank and an inwardly turned end of the leg. A locking nut is threaded onto a threaded portion of the collar to abut the inwardly turned end of the leg. After the shank has been adjusted along the length of the stud, the locking nut is threaded against the end of the leg to cause the collar to be drawn in a direction out of the leg thereby compressively deforming the ring to frictionally engage the collar and leg. This, in turn, locks the shank against rotation relative to the leg.

20 Claims, 2 Drawing Sheets

CASTER LEG ASSEMBLY WITH ADJUSTMENT LOCKING MEANS

Figure 1:
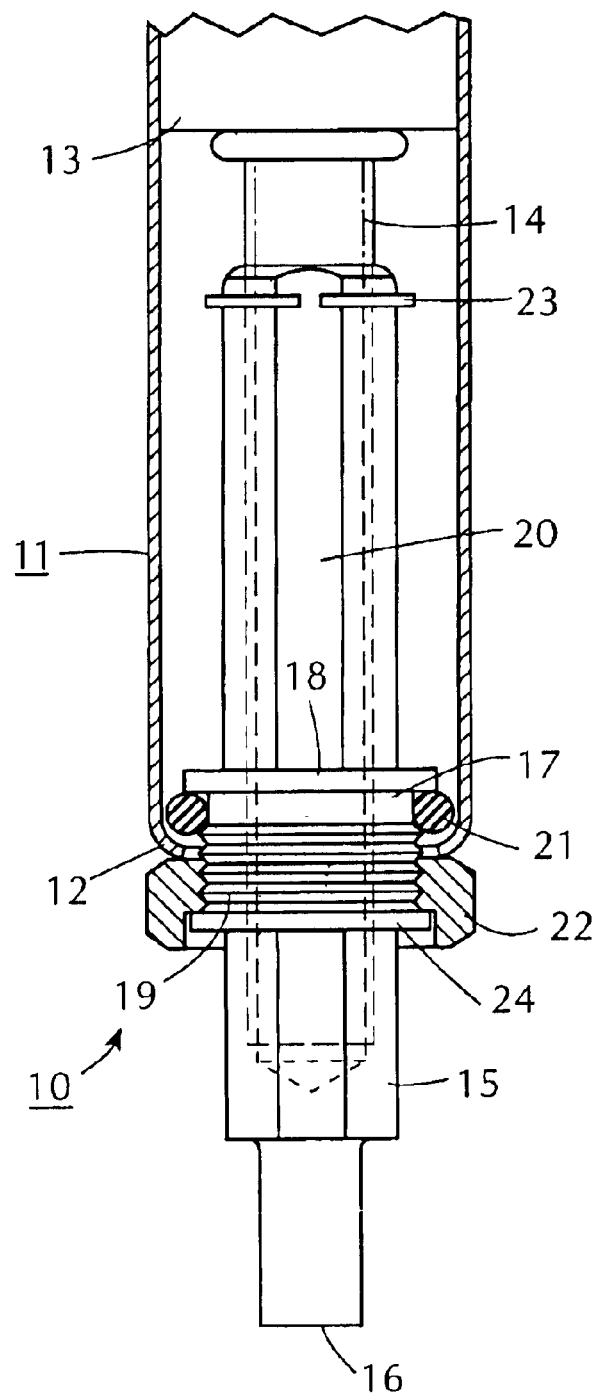

This invention relates to a caster leg assembly. More particularly, this invention relates to a caster leg assembly with an adjustment locking means.

As is known, various types of tables used in commercial establishments and industrial establishments are mounted on casters so that the tables may be moved away from walls for purposes of cleaning under the tables or for movement of the tables from place-to-place. In the simplest case, the casters are constructed with a mounting stem that can be secured to a table leg, a yoke dependent from the stem and a wheel rotatably mounted in the yoke. In more sophisticated cases, the casters include an assembly that can be adjusted in height so that the table legs can be adjusted in height in order to raise or lower or to level the table surface relative to a ground support or floor.

In some cases, the table legs have been provided with a caster that has a height adjustment assembly that is simply threaded into the base of the leg so that upon rotation of the assembly, the overall length of the leg may be shortened or lengthened thereby lowering or raising the table surface or leveling the table surface. However, from time to time, the assemblies may become loosened so that the leg height changes thereby changing the height of the supported table surface or rendering the table surface out-of-level. Accordingly, provisions have been made to lock the height adjustment assembly in an adjusted position in order to preserve the adjustment position.

For example, in order to lock a height adjustment assembly for a caster in place, use has been made of set screws that are threaded radially into the leg for tightening against the height adjustment assembly. However, this is not aesthetically attractive. Further, in commercial establishments, such as the kitchens of restaurants and particularly, fast-food restaurants, dirt and vermin can collect in the threaded depressions of the leg and in the exposed threads and slots of the set screws. Still further, tools are required in order to adjust the assemblies from time to time.

Generally, standard tubular legs do not have holes for set screws. Accordingly, in these cases, specially modified legs have been required in order to provide threaded bores to receive the set screws.

In some instances, tables are constructed so that the height of the tables can be adjusted to accommodate disabled people or different heights of persons using the tables. To this end, provisions have been made to accommodate height adjustments of up to three inches.

As with any type of a threaded caster height adjustment assembly, there is a risk that the assembly may become inadvertently unthreaded from a leg thereby allowing a caster to fall off the leg. This may result in the table becoming tilted so that items on the table slide off the table causing damage to the items or to a person standing or seated at or near the table.

Accordingly, it is an object of the invention to provide a caster height adjustment assembly with a locking means that does not require set screws.

It is another object of the invention to provide a caster for a table leg that can be manually locked in place.

It is another object of the invention to prevent a caster from separating from a table leg.

It is another object of the invention to provide a caster with a height adjustment assembly that can be easily adapted to match current industry leg mount types.

It is another object of the invention to provide a caster for a leg with an adjustable locking means for a height adjustment assembly that does not require special tools.

It is another object of the invention to provide a caster for a table leg that can accommodate adjustments in height of from one to eight inches.

It is another object of the invention to provide a caster for a leg assembly that is sealed against the outside environment.

Briefly, the invention provides a caster height adjustment assembly for a tubular leg that can be locked in place manually without the need for special tools.

The height adjustment assembly comprises a threaded stud for mounting within a tubular leg and a shank that is threaded onto the stud. Rotation of the shank on the stud allows the overall length of the assembly and, thus, the tubular leg, to be increased or decreased so as to raise or lower the surface of a table mounted on the leg or to allow for leveling of the table surface or for leveling of equipment on the table.

The height adjustment assembly also includes a collar that is slidably mounted on the shank in non-rotatable relation within the plane of the leg. In this respect, the shank has at least one longitudinally disposed flat within the plane of the collar and the collar has a centrally disposed opening receiving the shank in mating relation to prevent relative rotation therebetween. Any other suitable arrangement may also be used, such as a tongue and groove arrangement, a spline arrangement and the like, for preventing relative rotation between the collar and the shank.

The collar is also provided with an annular shoulder at one end and an externally threaded annular portion at the opposite end for projection through the end of the leg.

The height adjustment assembly employs at least one element of resiliently deformable material that is positioned on the collar for abutment against the shoulder as well as a locking nut that is threaded onto the threaded annular portion of the collar. Threading of the locking nut along the collar and against the end of the tubular leg causes the collar to be drawn in a direction to resiliently deform the element into frictional engagement with the shoulder of the collar and the inside of the tubular leg in order to lock the collar against rotation relative to the tubular leg. As a result, rotation of the shank relative to the stud is prevented.

Typically, the height adjustment assembly is mounted within a tubular leg that has an inwardly turned end that defines an opening of predetermined diameter. In addition, the annular shoulder of the collar is of a smaller diameter than the opening in the leg so as to be fitted through the end of the leg during assembly. Likewise, the deforable element, for example, an annular ring of rubber or elastomer, has an outer diameter that is greater than the outer diameter of the annular shoulder and the diameter of the opening in the end of the leg. Since the ring is deformable, the ring may be easily fitted through the opening of the leg during assembly and then allowed to expand so that the outer diameter of the ring is greater than the diameter of the opening in the leg.

The locking nut is sized to abut against the inwardly turned end of the leg so that continued threading of the nut draws the collar in a direction out of the leg thereby deforming the annular ring into frictional engagement between the inwardly turned end and inside cylindrical surface of the leg and the annular shoulder and neck of the collar. Threading is continued until the frictional contact of the ring on the collar and leg is sufficient to lock the collar against rotation relative to the leg. In addition, the deformed annular ring serves as a seal to prevent dust, dirt and debris from entering the tubular leg.

Once the collar is locked place, the shank cannot be rotated.

In order to adjust the caster, the lock ring is threaded in an opposite direction to loosen the frictional contact between the annular ring and the collar and/or inwardly turned end of the leg. Once loosened, the collar may be rotated relative to the leg. At that time, the shank may be rotated on the stud to either increase or decrease the overall length of the caster and thus the leg. After an adjustment has been made, the threaded nut is tightened to again lock the collar and the shank in place.

Figure 2:
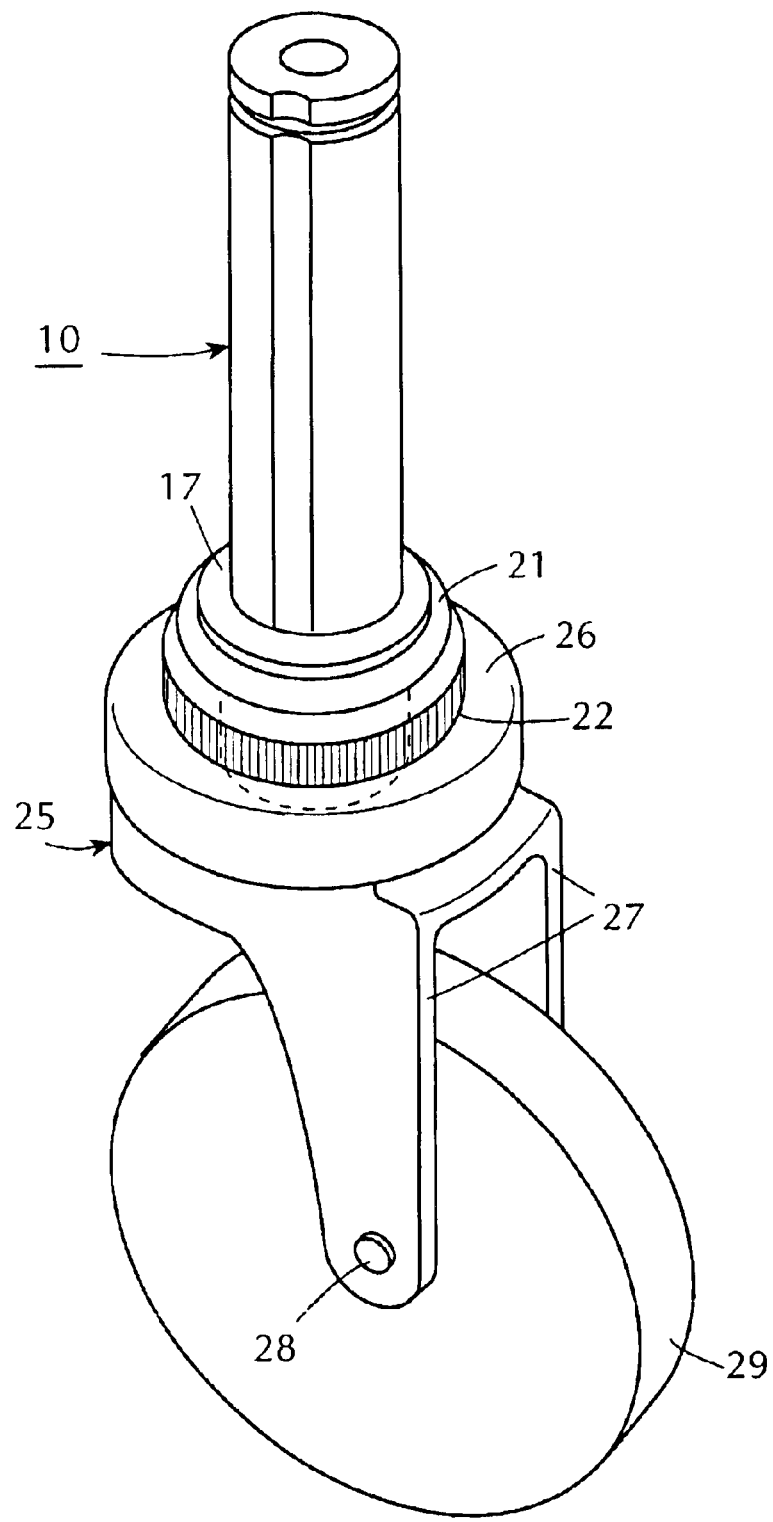

These and other objects and advantages of the invention will become more apparent from the following detailed description taken in conjunction with the accompanying drawing wherein:

FIG. 1 illustrates a cross-sectional view of a caster height adjustment assembly mounted in a tubular leg in accordance with the invention; and FIG. 2 illustrates a perspective view of a caster employing the height adjustment assembly of FIG. 1.

Referring to FIG. 1, the height adjustment assembly 10 is employed with a tubular leg 11. As indicated, the tubular leg 11 is of generally conventional structure and has an inwardly turned end 12 to form an opening of predetermined diameter. The leg 11 also has an internally disposed stud support 13 or the like that serves as a support for the assembly 10.

The height adjustment assembly 10 includes a threaded stud 14 that is disposed concentrically within the leg 11. The stud 14 may be welded to the stud support 13 so as to be fixed in place. Alternatively, the stud 14 may be constructed so as to be threaded into the stud support 13 or otherwise secured in an fixed non-rotatable relation to the leg 11.

The assembly 10 also includes a shank 15 with an internally threaded bore by which the shank 15 is threaded onto the stud 14. The shank 15 extends co-axially of and through the opening in the leg 11. The shank 15 may be of any suitable shape and contour so as to form a pin 16 for securement to a wheel assembly as described below.

The shank 15 is of stepped cylindrical construction and presents smooth surfaces that can readily cleaned. The shank 15 does not provide any recessed areas in which dirt may accumulate.

Typically, the leg 11 is secured on a vertical axis to the underside of a table, for example, a table used in a commercial restaurant kitchen.

Threading of the shank 15 on the stud 14 effects a shortening of the overall length of the caster 10 in one direction and a lengthening of the overall length of the caster 10 in the opposite direction. This, in turn, effects the overall length of the leg 11 for purposes of lowering or raising the table top or for purposes of leveling the table top (not shown) that is mounted on the leg 11. A collar 17 is slidably mounted on the shank 15 in non-rotatable relation within the leg 11. This collar 17 includes an annular shoulder 18 at one end that is of smaller diameter than the diameter of the opening in the inwardly turned end 12 of the leg 11 as well as an externally threaded annular portion 19 that extends through the end 12 of the leg 11. In order to prevent relative rotation between the shank 15 and collar 17, the shank 15 is provided with at least one longitudinally disposed flat 20 within the plane of the collar 17 while the collar 17 has a centrally disposed opening (not shown) receiving the shank 15 in mating relation to prevent relative rotation therebetween. That is to say, the opening in the collar 17 is shaped to have a flat opposite the flat 20 of the shank 15.

An element in the form of an annular ring 21 of resiliently deformable material is positioned between the shoulder 18 of the collar 17 and the inwardly turned end 12 of the leg 11 in order to retain the collar 17 within the leg 11. As illustrated, the annular ring 21 is a rubber O-ring that has an inner diameter less than the diameter of the shoulder 18 of the collar 17 and an outer diameter greater than the diameter of the shoulder 18. The outer diameter of the ring 21 is also greater than the diameter of the opening in the inwardly turned end 12 of the leg 11.

A locking nut 22 is threaded onto the threaded annular portion 19 of the collar 17 externally of the leg 11 for threading along the collar 17 and against the inwardly turned end 12 of the leg 11. This locking nut 22 may have a knurled outer cylindrical periphery to facilitate gripping or may have a polygonal periphery.

A retaining ring 23 is mounted in an upper end of shank 15, as viewed, in order to prevent the shank 15 from passing through the collar 17. In this respect, the ring 23 is of a size to not pass through the aperture (not shown) in the collar 17.

A second retaining ring 24 in the form of a push ring is provided at the lower end of the collar 17 in order to prevent the lock nut 22 from being unthreaded off the collar 17.

Referring to FIG. 2, the height adjustment assembly 10 is attached to a caster 25 via the pin 16 (not shown). For example, the pin 16 is inserted through a central aperture (not shown) in the caster 25 and peened over by an orbital riveter to rotatably secure the caster 25 to the pin 16. Alternatively, the pin 16 may be staked in order to secure the caster 25 to the pin 16. Any other suitable operation may be performed to secure the caster 25 to the pin 16 in a rotatable manner.

The caster 25 is of swivel type and has a dust cover 26 for an upper race ring and a yoke or lower race ring with a pair of dependent legs 27 that receive an axle 28 on which a wheel 29 is mount ed. The wheel 29 may be of a ball bearing type with an outer race that rotates on the axle 28 or of any other suitable type.

The height adjustment assembly 10, caster 25 and wheel 29 constitute a caster leg assembly that can be secured to a tubular leg 11 as indicated in FIG. 1.

Various techniques may be employed to mount the caster leg assembly in the leg 11. For example, the leg 11 may be fabricated with the threaded stud 14 in place on the stud support 13.

Referring to FIG. 2, the height adjustment assembly 10 is typically secured to the caster 25 prior to being mounted in the leg 11 shown in FIG. 1 and the locking nut 22 is disposed in a position on the shank 15 so that the annular ring 21 is in a relaxed position. In this condition, the assembly is fitted into the leg 11 shown in FIG. 1.

Referring to FIG. 1, wherein the caster of FIG. 2 has been omitted for simplicity, in order to mount the caster leg assembly in the leg 11, the shank 15 is threaded onto the stud 14 far enough to permit the collar 17 to fully enter the leg 11 by passing through the opening in the inwardly turned end 12 of the leg 11. This is possible since the diameter of the shoulder 18 is smaller than the opening in the inwardly turned end 12 of the leg 11.

Next, the O-ring 21 is deformed and inserted into the leg 11 while passing over the threads on the annular portion 19 of the collar 17 and up against the shoulder 18 on the collar 17.

The shank 15 is then threaded out of the leg 11 until the threads on the collar 17 protrude out of the leg 11. At this time, the locking nut 22 should be loose so that the caster height can be adjusted.

After a height adjustment has been made to raise or lower the table that is supported on the leg 11, the locking nut 22 is manually threaded along the threaded portion 19 of the collar 17 into abutment with the inwardly turned end 12 of the leg 11 while the shank 15 is manually held against rotation. Continued rotation of the locking nut 22 draws the collar 17 downwardly in a direction out of the leg 11 thereby resiliently compressively deforming the ring 21 into frictional engagement with the shoulder 18 and stem of the collar 17 and the inwardly turned end 12 and cylindrical inside wall of the leg 11 in order to lock the collar 17 against rotation relative to the leg 11. At the same time the ring 21 effects a seal to prevent vermin and the like from entering the leg 11.

Locking of the collar 17 relative to the leg 11, in turn, locks the shank 15 against rotation relative to the leg 11. Thus, once the height adjustment assembly 10 has been adjusted to a desired position, threading of the locking nut 22 accomplishes a locking of the assembly 10 in this position.

The stud 14 and shank 15 are constructed so that the shank 15 may be threaded along the stud 14 any suitable distance depending on the type of leg 11 in which the assembly 10 is mounted. For example, the shank 15 may be threaded over a distance of more than three inches in order to allow a table top supported on the leg 11 to be raised or lowered to accommodate a disabled person or persons of different heights. Height adjustments of from one to eight inches are possible.

In order to change or re-adjust the height of the leg, the locking nut 22 need only be manually loosened by a reverse rotation so as to release the frictional contact between the deformable ring 21 and the collar 17 and/or leg 11. Once the collar 17 has been loosened, the collar 17 is free to turn along with the shank 15 relative to the leg 11 and stud 14.

The retainer ring 24 is fitted into place in order to prevent the locking nut 22 from being unthreaded from the collar 17 while allowing the locking nut 22 to move along the threads of the collar 17 between a loosened position spaced from the inturned end 12 of the leg 11 and a locking position abutted against the inturned end 12 of the leg 11.

Alternatively, any suitable deformable means other than an annular ring may be used. For example, a plurality of circumferentially spaced resiliently deformable elements (not shown) may be positioned about the collar 17, for example, in recesses that accomodate the positioning of the blocks. These blocks would be deformed radially inwardly in order to pass through the opening in the inturned end of the leg 11 and would be compressed and deformed radially outwardly upon tightening of the locking nut 22 against the inturned end of the leg 11 in order to lock the collar 17 against rotation relative to the leg 11.

The invention thus provides a relatively simple means for locking a caster height adjustment assembly against rotation. Further, the invention provides a caster which may be easily and rapidly fixed in a desired position of height adjustment without the need for tools.

Still further, the invention provides a caster height adjustment assembly that does not require reworking of a tubular leg in order to receive set screws for fixing the assembly in place.

The invention further provides a caster leg assembly that has a simple reliable height adjustment capability that is particularly suitable for equipment that rests on pitched floors and must be moved for cleaning and servicing.

The invention allows tables that are used on pitched or uneven floors to be leveled and provides a means for moving equipment for cleaning and servicing.

What is claimed is:

1. The combination comprising
   a tubular leg;
   a threaded stud disposed concentrically in said leg;
   a shank threaded onto said stud and extending coaxially of and through said leg;
   a collar mounted concentrically of said shank in non-rotatable longitudinally movable relation thereto and within said leg, said collar having an externally threaded annular portion extending through said leg;
   at least one element of resiliently deformable material positioned between said collar and said leg; and
   a locking nut threaded onto said threaded annular portion of said collar externally of said leg for abutting against said leg whereby threading of said nut relative to said collar and against said leg draws said collar in a direction out of said leg to resiliently deform said element into frictional engagement with said collar and said leg to lock said collar against rotation relative to said leg.

2. The combination as set forth in claim 1 further comprising a retaining ring mounted on said collar to retain said lock nut on said collar.

3. The combination as set forth in claim 1 wherein said shank has at least one longitudinally disposed flat thereon within the plane of said collar and said collar has a centrally disposed opening receiving said shank in mating relation to prevent relative rotation therebetween.

4. The combination as set forth in claim 3 further comprising a retaining ring mounted at an end of said shank to prevent said shank from being unthreaded from said stud through said collar.

5. The combination as set forth in claim 1 wherein said element is an annular ring.

6. The combination as set forth in claim 5 wherein said collar has an annular shoulder abutting said annular ring.

7. The combination as set forth in claim 1 wherein said leg has an inwardly turned end receiving said element thereon and disposed for abutment with said locking nut.

8. The combination comprising
   a tubular leg having an inwardly turned end;
   a threaded stud disposed concentrically in said leg;
   a shank threaded onto said stud and extend ing coaxially of and through said leg;
   a collar slidably mounted on said shank in non-rotatable relation thereto and within said leg, said collar having an annular shoulder at one end and an externally threaded annular portion at an opposite end extending through said leg;
   an annular ing of resiliently deformable material positioned between said shoulder of said collar and said inwardly turned end of said leg; a nd
   a locking nut threaded onto said threaded annular portion of said collar externally of said leg for threading along said collar and against said inwardly turned end of said leg to draw said collar in a direction out of said leg to resiliently deform said ring into frictional engagement with said collar and said leg to lock said collar against rotation relative to said leg.

9. The combination as set forth in claim 8 further comprising a retaining ring mounted on said collar to retain said locking nut on said collar.

10. The combination as set forth in claim 8 wherein said shank has at least one longitudinally disposed flat thereon within the plane of said collar and said collar has a centrally disposed opening receiving said shank in mating relation to prevent relative rotation therebetween.

11. The combination as set forth in claim 10 further comprising a retaining ring mounted at an end of said shank to prevent said shank from being unthreaded from said stud through said collar.

12. The combination as set forth in claim 8 wherein said annular ring is an O-ring.

13. The combination comprising a tubular leg having an inwardly turned end defining an opening of predetermined diameter;

a threaded stud disposed concentrically in said leg;

a shank threaded onto said stud and extending coaxially of and through said leg;

a collar slidably mounted on said shank in non-rotatable relation thereto and within said leg, said collar having an annular shoulder at one end of smaller diameter than said predetermined diameter of said end of said leg and an externally threaded annular portion at an opposite end extending through said leg;

an annular ring of resiliently deformable material positioned between said shoulder of said collar and said inwardly turned end of said leg to retain said collar within said leg; and a locking nut threaded onto said threaded annular portion of said collar externally of said leg for threading along said collar and against said inwardly turned end of said leg to draw said collar in a direction to resiliently deform said ring into frictional engagement with said collar and said leg to lock said collar against rotation relative to said leg.

14. The combination as set forth in claim 13 further comprising a retaining ring mounted on said collar to retain said locking nut on said collar.

15. The combination as set forth in claim 13 wherein said shank has at least one longitudinally disposed flat thereon within the plane of said collar and said collar has a centrally disposed opening receiving said shank in mating relation to prevent relative rotation therebetween.

16. The combination as set forth in claim 15 further comprising a retaining ring mounted at an end of said shank to prevent said shank from being unthreaded from said stud through said collar.

17. The combination as set forth in claim 13 wherein said annular ring is an O-ring.

18. A caster leg assembly comprising a shank having an internally threaded bore;

a collar slidably mounted on said shank in non-rotatable relation thereto, said collar having an annular shoulder at one end and an externally threaded annular portion at an opposite end;

at least one element of resiliently deformable material positioned on said collar for abutment against said shoulder;

a locking nut threaded onto said threaded annular portion of said collar for threading along said collar and against an end of a tubular leg in which said shank is mounted to draw said collar in a direction to resiliently deform said element into frictional engagement with said collar and the tubular leg to lock said collar against rotation relative to the tubular leg;

a yoke secured to said shank; and a wheel mounted in said yoke.

19. A caster leg assembly as set forth in claim 18 further comprising a retaining ring mounted on said collar to retain said locking nut on said collar.

20. A caster leg assembly as set forth in claim 18 wherein said shank has at least one longitudinally disposed flat thereon within the plane of said collar and said collar has a centrally disposed opening receiving said shank in mating relation to prevent relative rotation therebetween.

* * * * *

UNITED STATES PATENT AND TRADEMARK OFFICE
CERTIFICATE OF CORRECTION

PATENT NO. : 6,886,216 B2
DATED : May 3, 2005
INVENTOR(S) : Thomas Graham

It is certified that error appears in the above-identified patent and that said Letters Patent is hereby corrected as shown below:

Column 6,
Line 44, "extend ing" should be -- extending --
Line 52, "ing" should be -- ring --
Line 54, "a nd" should be -- and --

Signed and Sealed this

Twelfth Day of July, 2005

JON W. DUDAS
*Director of the United States Patent and Trademark Office*